Patented Apr. 5, 1932

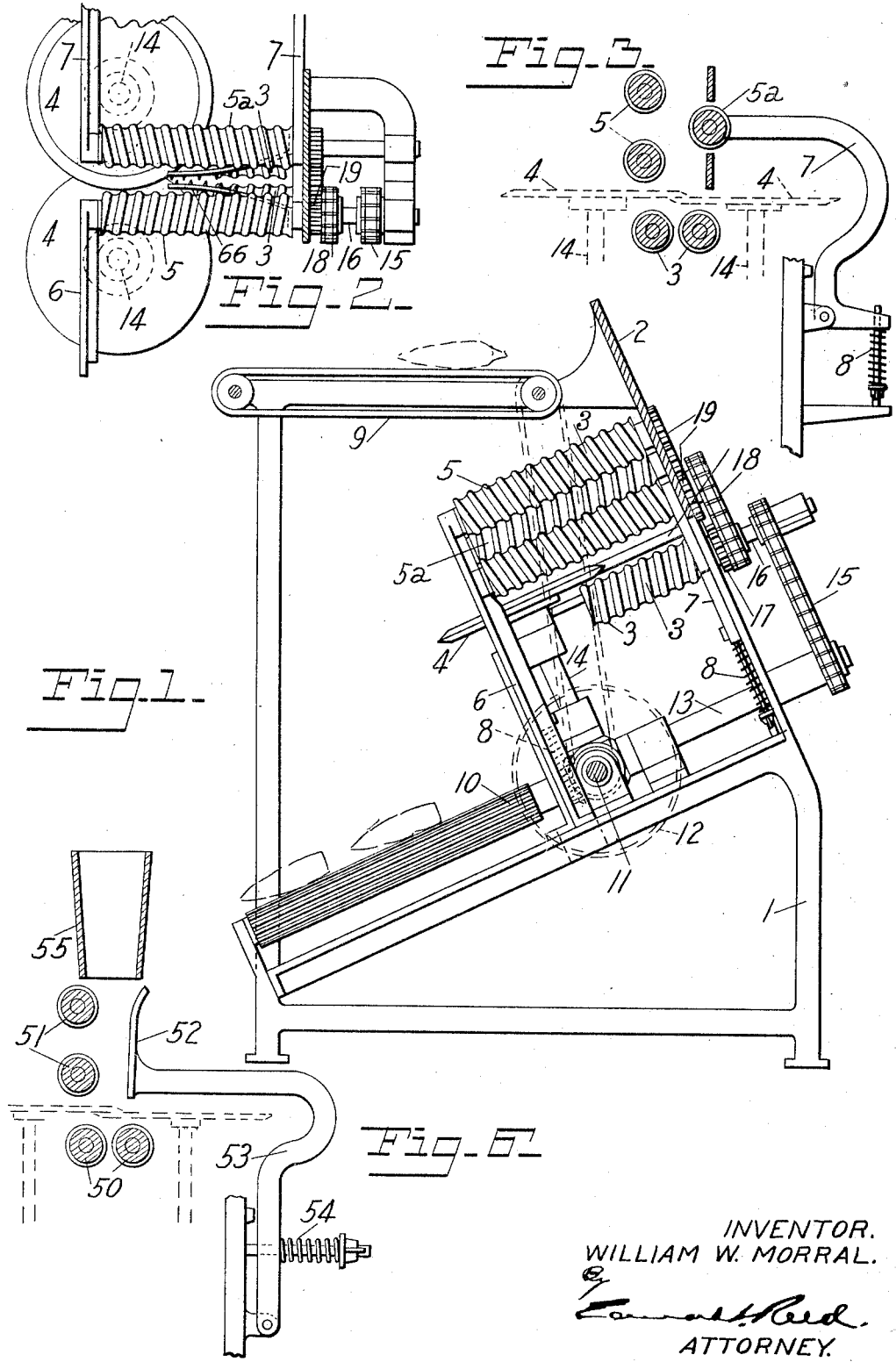

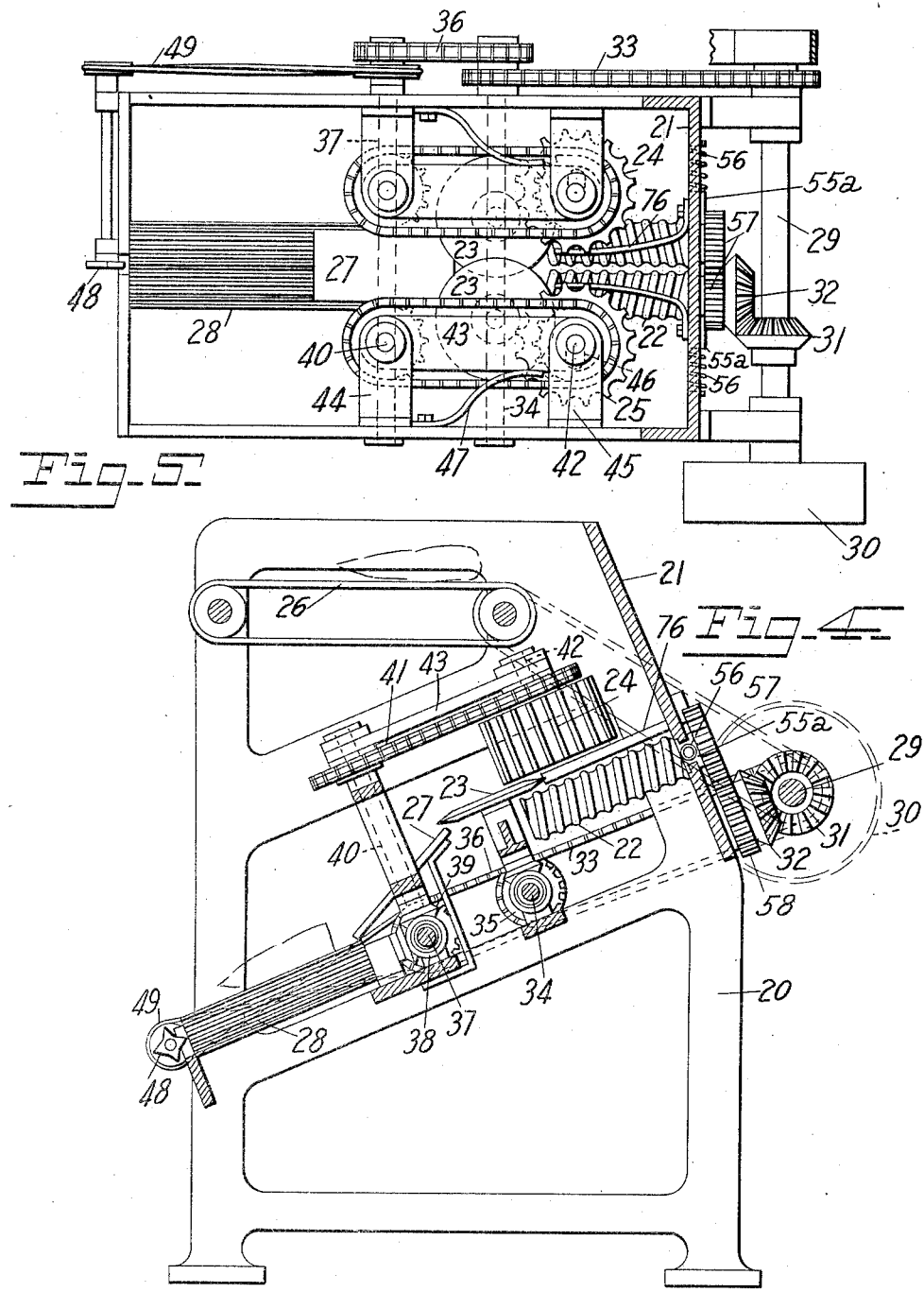

1,852,328

UNITED STATES PATENT OFFICE

WILLIAM W. MORRAL, OF MORRAL, OHIO

CORN BUTTING AND HUSKING MECHANISM

Application filed May 16, 1928. Serial No. 278,212.

This invention relates to corn butting and husking mechanisms and one object of the invention is to provide a combined butting and husking mechanism which will be simple in its construction, compact in its arrangement, and efficient in operation.

A further object of the invention is to provide such a mechanism in which gravity will assist in the proper positioning and feeding of ears of corn.

Other objects of the invention will appear as the mechanism is described in detail.

In the accompanying drawings Fig. 1 is a side elevation of a butting and husking mechanism embodying my invention, partly in section; Fig. 2 is a plan view of the butting mechanism; Fig. 3 is a sectional view taken on the line 3—3 of Fig. 1; Fig. 4 is a vertical sectional view of a slightly modified form of the invention, showing the butting and husking mechanism in elevation; Fig. 5 is a plan view of the device of Fig. 4, partly in section; and Fig. 6 is a transverse sectional view of a portion of the machine showing a modified form of feeding mechanism.

In these drawings I have illustrated one embodiment of my invention, together with a slight modification thereof, but it will be understood that this particular embodiment has been chosen for the purposes of illustration only, and that the mechanism may take various forms without departing from the spirit of the invention.

As shown in Figs. 1 to 3, the machine comprises a main frame 1 the upper rear portion of which is in the form of a plate and is inclined forwardly and upwardly, as shown at 2. Mounted on this inclined portion of the main frame are a pair of gaging members which are inclined forwardly and downwardly and which preferably comprise spiral rollers 3 arranged side by side and adapted to receive between them the butt end of an upright ear of corn. Arranged adjacent to the discharge end of the gaging rollers is a butt removing device which, in the present instance, comprises a pair of rotary blades 4. Mounted above the gaging rollers and the cutter is a feeding device, which in the present instance, consists of a pair of rollers 5 arranged one above the other, and a third roller 5a spaced laterally from the rollers 5 and having its axis in a plane extending between the rollers 5. These rollers are provided with spiral grooves and the arrangement is such that they will receive an ear of corn between the rollers 5 and roller 5a and support the same in an upright position while they feed the ear past the butt removing device. The rollers 5 are supported at their rear ends by suitable bearings on the inclined portion of the frame and at their front ends in bearings on an inclined supplemental frame 6. Preferably the feeding roller 5a is mounted on pivoted brackets 7 which are acted upon by springs 8 which tend to press the movable roller toward the other rollers but permit the same to yield to accommodate the feeding device to ears of different diameters. Mounted above the feeding device is a conveyor adapted to deliver ears of corn to the gaging rollers and the feeding rollers, which, as here shown, comprises a substantially horizontal endless belt 9. Mounted on the lower portion of the frame and in front of the gaging rollers is a pair of husking rollers 10 which are inclined downwardly and forwardly, the rear ends of these rollers being adjacent to and preferably extending beneath the blades 4.

The several parts of the mechanism may be driven in any suitable manner but, as here shown, a main drive shaft 11 is provided with a belt wheel 12 and has geared connection with the shaft 13 of one of the husking rollers and with upright shafts 14 which carry the rotatable blades 4. The shaft 13 extends beyond the rear end of the frame and is connected by a sprocket chain 15 with the shaft 16 of one of the gaging rollers 3, the two rollers being geared one to the other, as shown at 17. The shaft 16 is connected by a sprocket chain 18 with the shaft of one of the feeding rollers 5, these rollers also being geared one to the other and to the roller 5a, as shown at 19.

In the operation of the machine the ears of corn are deposited one at a time, butt foremost, on the endless belt 9 and are discharged from the rear end of that belt onto the gaging rollers, the upper portion 2 of the frame serving to deflect the butt ends of the ears downward and to cause them to properly engage the gaging rollers. In this form of the device the ears pass between the feeding members to engage the gaging rollers and both the gaging rollers and the feeding rollers act upon the ear to advance the same into contact with the cutters. The feeding rollers carry the ear forward after the butt has been removed therefrom and cause it to be discharged beyond the cutter onto the inclined husking rollers 10 which remove the husks therefrom as they are moved downwardly along the same by gravity.

If desired, means may also be provided for loosening the husks of the ear to facilitate their removal by the husking rollers. In the present instance, I have mounted between the gaging rollers and the feeding rollers a pair of husking loosening members 66 in the form of forwardly converging longitudinal bars, the forward portions of which are provided with teeth or prongs to engage and loosen the husks on the ear. As shown, the husk loosening bars are mounted at their rear ends on the main frame, in a plane substantially parallel with the plane of the axes of the two gaging rollers, and have their rear portions spaced apart such a distance that the ear will move between the same into engagement with the gaging rollers. As the ear is advanced by the feeding device the husk will be yieldably engaged by the prongs on the forward portions of the bar.

In Figs. 4 and 5, I have shown a slightly different arrangement of the mechanism and have illustrated a different type of feeding mechanism. As there shown, the main frame 20 has an upwardly and forwardly inclined rear portion or plate 21. Mounted in the part 21 of the main frame is a pair of inclined gaging rollers 22 preferably of the spiral type and adjacent to the discharge end of these rollers is a cutter comprising a pair of rotary blades 23. Mounted above the gaging rollers and the cutter is a feeding device which, in the present instance, also comprises two rotatable grooved members but shows these members in the form of drums or wheels 24 having peripheral grooves extending lengthwise thereof, and providing the wheel with a series of ribs or blades 25 adapted to engage the ears of corn. These rotatable feeding members are spaced a sufficient distance from the rear wall or deflector plate 21 of the main frame to permit an ear of corn to pass between the same and the frame into engagement with the gaging rollers. A conveyor 26 is arranged above the feeding rollers and serves to deliver the ears butt end foremost onto the gaging rollers in the manner above described. The feeding devices are mounted on inclined axes so that they are substantially parallel with the gaging rollers and when the ear rests upon the gaging rollers it will tend to move forward by gravity into contact with the feeding devices which will grip the same and move the ear to and past the cutting edges of the cutter. As the ear passes beyond the cutter it falls upon a chute 27 which delivers it onto a pair of inclined husking rollers 28 down which the ear moves by gravity while the husk is being removed therefrom.

The driving mechanism is somewhat differently arranged in this form of device and the main driving shaft 29 extends transversely to the frame on the rear side thereof, is provided with a belt pulley 30 and has geared connection with the gaging rollers. In the present form of mechanism the gaging rollers are yieldably mounted to permit them to accommodate themselves to ears of different sizes. To this end the rollers are carried by bearings 55a slidably mounted in the frame and acted upon by springs 56 which tend to move the rollers one toward the other. The rollers are connected one to the other by spur gears 57, the yielding movement of the rollers not being sufficient to move the gears out of mesh. One of the gears 57 meshes with a spur gear 58 which is driven by a beveled gear 32 which meshes with a beveled gear 31 on the shaft 29. A sprocket chain 33 connects the shaft 29 with a transverse shaft 34 which is connected by beveled gears 35 with the shafts of the cutters 23. The shaft 34 is connected by a sprocket chain 36 with a second transverse shaft 37 which is connected by beveled gears 38 with the husking rollers and is connected by other beveled gears 39 with upright shafts 40 which are connected by sprocket chains 41 with shafts 42 which carry the feeding wheels 24, the shafts 42 and the upper ends of the shafts 40 being mounted in suitable bearings in supporting members or plates 43 carried by the main frame. The supporting members 43 are mounted for pivotal movement about the respective shafts 40 and rest upon brackets 44 and 45, the brackets 45 being slotted as shown at 46 to receive the shafts 42 of the drums 24 and permit the drums to have a limited movement toward and from each other. Springs 47 tend to move the drums one toward the other. To prevent husks or small ears wedging between the bearings at the lower ends of the husking rollers I have mounted a toothed wheel 48 at the lower end of the rollers and have so arranged the same that the teeth thereof will pass upwardly between the bearings of the husking rollers to dislodge any husks or small ears which may wedge between the same. This toothed wheel is driven by a belt 49 from the shaft 37. If desired, a husk loosening device may be provided and I have here shown a pair of forwardly converging resilient bars 76 arranged between the feeding drums and the gaging rollers, these bars being similar to husk loosening bars 66 heretofore described.

In Fig. 6 I have shown a slightly modified form of the feeding device shown in Figs. 1 to 3. As here shown, the gaging rollers 50 and the stationary feeding rollers 51 are arranged in the same manner as are the gaging rollers 3 and the feeding rollers 5 but I have substituted for the laterally movable feeding roller 5a a flat faced bar 52 which extends lengthwise of the feeding rollers 51 and is spaced laterally therefrom so that the ear may be received between the rollers and the bar. The bar is yieldably mounted so that it will hold the ear firmly in contact with the feeding rollers but will yield to permit the passage of ears of different sizes. As here shown, the bar is carried by brackets or arms 53 pivotally mounted on the frame and acted upon by springs 54 which serve to press the bar toward the rollers. In this form of the device I have also shown a guideway or chute 55 arranged above the feeding device to deliver the ear in an upright position to the feeding device and gaging rollers. The ears may be deposited in this chute by hand or in any suitable manner.

While I have shown and described certain embodiments of my invention I wish it to be understood that I do not desire to be limited to the details thereof as various modifications may occur to a person skilled in the art.

Having now fully described my invention, what I claim as new and desire to secure by Leters Patent, is:

1. In a corn butting mechanism, a pair of forwardly and downwardly inclined spiral gaging rollers, a butt removing device arranged adjacent to the discharge ends of said gaging rollers, a pair of rotatable feeding members arranged above said gaging rollers and having parts to engage an ear of corn which is supported in an upright position on said gaging rollers and move said ear of corn toward and past said butt removing device, a substantially horizontal conveyor arranged above said feeding members, and a deflector to engage the rear end of an ear of corn as it is discharged from said conveyor and direct the same downward in an upright position onto said gaging rollers.

2. In a mechanism of the character described, a pair of gaging members arranged side by side to receive the butt end of an upright ear of corn between them, a butt removing device arranged adjacent to the discharge ends of said gaging members, and rotatable grooved feeding members mounted above said gaging members to receive an ear of corn between them, support the same in an upright position on said gaging members and move said ear along said gaging members and past said butt removing device, and forwardly converging husk loosening members arranged between said gaging members and said feeding members and having their rear portions spaced apart to permit the ear to pass between the same into engagement with said gaging members.

3. In a corn butting mechanism, a butt removing device, a pair of gaging members to guide the butt end of an ear of corn into engagement with said butt removing device, a feeding device arranged above said gaging members to move said ear of corn toward said butt removing device, a conveyor to deliver an ear of corn to said feeding mechanism, and a deflector to cause said ear to be delivered in an upright position on said gaging members and to be engaged by said feeding device.

4. In a corn butting mechanism, a pair of gaging rollers, a butt removing device arranged adjacent to the discharge ends of said gaging rollers, feeding members arranged above said gaging rollers and having parts to engage an ear of corn which is supported in an upright position on said gaging rollers and move said ear of corn toward and past said butt removing device, a continuous conveyor arranged above said feeding members, and means to engage the butt end of an ear of corn as it is discharged from said conveyor and to direct the same downwardly in an upright position onto said gaging rollers.

5. In a corn butting mechanism, gaging members, a butt removing device arranged adjacent to the discharge ends of said gaging members, a pair of rotatable feeding members arranged above said feeding members and having parts to engage an ear of corn which is supported in an upright position on said gaging members and to move said ear of corn toward and past said butt removing device, a continuous conveyor arranged above said feeding members, and means to engage the butt end of an ear of corn as it is discharged from said continuous conveyor and to direct the same downwardly in an upright position onto said gaging members.

In testimony whereof, I affix my signature hereto.

WILLIAM W. MORRAL.